(12) United States Patent
Shen

(10) Patent No.: US 10,726,705 B2
(45) Date of Patent: Jul. 28, 2020

(54) METHOD FOR CONTROLLING DOOR ACCESS WITH IMPROVED SAFETY

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 0 days.

(21) Appl. No.: 16/716,768

(22) Filed: Dec. 17, 2019

(65) Prior Publication Data

US 2020/0211362 A1    Jul. 2, 2020

Related U.S. Application Data

(63) Continuation-in-part of application No. 16/234,775, filed on Dec. 28, 2018.

(30) Foreign Application Priority Data

Nov. 25, 2019   (TW) .............................. 108142809 A

(51) Int. Cl.
```
G08B 25/00        (2006.01)
E05B 65/00        (2006.01)
G08B 25/10        (2006.01)
G07C 9/00         (2020.01)
G05B 15/02        (2006.01)
```
(52) U.S. Cl.
CPC ........ *G08B 25/006* (2013.01); *E05B 65/0003* (2013.01); *G05B 15/02* (2013.01); *G07C 9/00571* (2013.01); *G08B 25/10* (2013.01)

(58) Field of Classification Search
None
See application file for complete search history.

(56) References Cited

U.S. PATENT DOCUMENTS

| | | | | |
|---|---|---|---|---|
| 5,496,079 A * | 3/1996 | Frolov | ............... | E05B 65/1046 |
| | | | | 292/251.5 |
| 6,552,963 B2* | 4/2003 | Baranek | ................ | G08B 7/066 |
| | | | | 367/129 |
| 9,354,619 B2* | 5/2016 | Ergenbright | ........... | G05B 13/00 |
| 9,886,831 B1* | 2/2018 | Svoboda | ................. | G08B 7/06 |
| 9,890,563 B2 | 2/2018 | Shen | ................... | E05B 47/0001 |
| 10,062,233 B1* | 8/2018 | Rogers | ............... | G07C 9/00309 |
| 10,458,151 B1 | 10/2019 | Shen | ....................... | E05B 45/06 |
| 2002/0180582 A1 | 12/2002 | Nielsen | ............... | G07C 9/00103 |
| | | | | 340/5.6 |
| 2006/0114749 A1* | 6/2006 | Baxter | ..................... | G01S 5/22 |
| | | | | 367/128 |

(Continued)

*Primary Examiner* — Curtis J King
(74) *Attorney, Agent, or Firm* — Alan D. Kamrath; Mayer & Williams PC

(57) ABSTRACT

A method for controlling door access with improved safety includes connecting door locks with a control device. Through physical and electrical connection by an emergency control unit, the control device can set all door locks to a locking state and can revoke unlocking authority of all door locks. When the emergency control unit is physically disconnected from the control device, all door locks can operate independently in locking and unlocking. Furthermore, the control device is connected to at least one gunshot detection device and/or at least one fire detection device. When a gunshot event and/or a fire occurs, the door locks near the gunshot location or the fire can be rapidly locked to reduce the movement speed of the gunman and/or the spreading speed of the fire.

12 Claims, 2 Drawing Sheets

(56) References Cited

U.S. PATENT DOCUMENTS

| | | | |
|---|---|---|---|
| 2007/0204665 A1 | 9/2007 | Lie-Nielsen | E05B 47/0676 70/472 |
| 2008/0066506 A1 | 3/2008 | Carbajal | A47F 3/043 70/267 |
| 2009/0100884 A1* | 4/2009 | Carr | E05B 47/00 70/163 |
| 2010/0201536 A1 | 8/2010 | Robertson | G07C 9/00904 340/686.6 |
| 2010/0281933 A1* | 11/2010 | Barrieau | E05C 17/56 70/263 |
| 2012/0190325 A1* | 7/2012 | Abu-Hakima | H04W 4/90 455/404.2 |
| 2013/0346333 A1* | 12/2013 | Hassler | G06Q 10/107 705/325 |
| 2014/0240128 A1* | 8/2014 | Deangelo | G08B 13/08 340/545.2 |
| 2014/0269199 A1* | 9/2014 | Weldon | G01S 5/18 367/124 |
| 2014/0327543 A1* | 11/2014 | Showen | G08B 17/08 340/540 |
| 2014/0361886 A1* | 12/2014 | Cowdry | G08B 13/1672 340/522 |
| 2015/0070166 A1* | 3/2015 | Boyden | G08B 25/08 340/540 |
| 2015/0146002 A1* | 5/2015 | Cruz | H04N 7/183 348/156 |
| 2015/0194033 A1* | 7/2015 | Esposito | F41A 17/063 340/686.6 |
| 2015/0339913 A1* | 11/2015 | Lyman | H04W 4/90 340/287 |
| 2016/0232774 A1* | 8/2016 | Noland | G08B 13/1672 |
| 2016/0360020 A1 | 12/2016 | Shen | H04M 1/7253 |
| 2017/0004694 A1* | 1/2017 | Dodson | G08B 25/006 |
| 2018/0053394 A1* | 2/2018 | Gersten | G08B 21/02 |
| 2018/0122030 A1* | 5/2018 | Raz | G05B 19/0428 |
| 2019/0080577 A1* | 3/2019 | Raz | G08B 17/08 |
| 2019/0130723 A1* | 5/2019 | Thiel | G07C 9/00896 |
| 2019/0284855 A1* | 9/2019 | Bertelli | E05C 19/002 |
| 2019/0295397 A1* | 9/2019 | Eckert | G08B 13/1672 |

* cited by examiner

METHOD FOR CONTROLLING DOOR ACCESS WITH IMPROVED SAFETY

CROSS REFERENCE TO RELATED APPLICATION

This is a continuation-in-part application of U.S. patent application Ser. No. 16/234,775 filed Dec. 28, 2018, the entire contents of which are incorporated herein by reference.

BACKGROUND OF THE INVENTION

The present invention relates to a method for controlling door access with improved safety and, more particularly, to a method for simultaneously locking a plurality of door locks and simultaneously revoking the unlocking authorities of at least one of the plurality of locks.

There are various types of door locks available in the market, including mechanical locks and electronic locks incorporating motors, electromagnetic valves, and electronic parts. These door locks can be locked or unlocked separately. When the door locks are operated to be in a locking state while the door is closed, the door cannot move from the closed position to the open position, achieving an anti-burglar function.

When the door locks are used in a unit having many rooms, there is no guarantee that the door locks can reliably prevent burglars from breaking into the rooms. For example, in a school having a plurality of classrooms each having its own door and its own door lock, it is difficult to make sure the door of every classroom is locked after class. Furthermore, it is impossible to lock the door of every classroom in the school immediately after a security event occurs to prevent entry of the burglars, nor can the school report to the police at the first moment. In another example of a large company having a plurality of offices each having a door and a door lock, it is difficult to lock all offices at the same time. As a result, the school or the large company has to hire a person to check whether every door is locked. Furthermore, when a fire occurs, the doors near the fire cannot be closed in time. Furthermore, in an event of a gunshot (e.g., a gunshot event in a school), it is difficult to timely control door access for delaying or stopping the gunman.

BRIEF SUMMARY OF THE INVENTION

In a first aspect, a method for controlling door access with improved safety according to the present invention includes:

connecting a plurality of door locks with a control device, with the control device obtaining control authority of each of the plurality of door locks;

detecting whether an emergency control unit is physically and removably connected to the control device, wherein each of all of the plurality of door locks obtains unlocking authority and locking authority and is capable of being operated independently when the emergency control unit is not connected to the control device;

identifying the emergency control unit when the emergency control unit is physically and removably connected to the control device, wherein each of all of the plurality of door locks obtains the unlocking authority and the locking authority and is capable of being operated independently when the emergency control unit connected to the control device is identified as being incorrect;

simultaneously setting all of the plurality of door locks connected to the control device into a locking state when the emergency control unit connected to the control device is identified as being correct, and the control device enters a first priority emergency state, wherein an alarm is generated while all of the plurality of door locks are set to the locking state, wherein all of the plurality of door locks lose the unlocking authority and are incapable of being unlocked independently when the emergency control unit is identified as being correct;

deciding whether to physically disconnect the emergency control unit from the control member, wherein all of the plurality of door locks remain in the locking state and lose the unlocking authority when the emergency control unit is not physically disconnected from the control device;

logging in a backstage with a computer or a smart mobile device with a preset account and a password to connect with the control device when the emergency control unit is physically disconnected from the control device;

selectively lifting or not lifting the first priority emergency state after logging in the backstage, wherein all of the plurality of door locks set in the locking state remain in losing the unlocking authority when the first priority emergency state is not lifted, and wherein all of the plurality of door locks set in the locking state restore the unlocking authority and the locking authority and are capable of being operated independently when the first priority emergency state is lifted while the emergency control unit is physically disconnected from the control device;

detecting whether a gunshot event occurs, wherein each of the plurality of door locks retains the unlocking authority when no gunshot event is detected, wherein a gunshot information containing a gunshot location of the gunshot event is sent to the control device when the gunshot event is detected, and wherein the control device reports the gunshot location to a police system;

setting at least one of the plurality of door locks near the gunshot location to the locking state and revoking the unlocking authority of the at least one of the plurality of door locks, and entering a gunshot control state; and selectively lifting or not lifting the gunshot control state after logging in the backstage while the emergency control unit is physically disconnected from the control device, wherein the at least one of the plurality of door locks near the gunshot location loses the unlocking authority when the gunshot control state is not lifted, and wherein when the gunshot control state is lifted, the at least one of the plurality of door locks near the gunshot location restores the unlocking authority and the locking authority and is capable of being operated independently.

The method for controlling door access with improved safety according to the present invention provides detection and control of a gunshot to rapidly detect the gunshot location, and the control device can be used to rapidly set the door locks near the gunshot location to the locking state and to revoke the unlocking authority, delaying or stopping the gunman from moving to another location.

In an example, the method further includes:

sending a first-class report to the police system after all of the plurality of door locks have lost the unlocking authority;

generating an alarm when the control device receives the gunshot location information of the gunshot event; and deactivating the alarm when the gunshot control state is lifted.

In an example, the method further includes:

selectively setting or not setting a second priority emergency state after logging in the backstage while the emergency control unit is physically disconnected from the control device, wherein all of the plurality of door locks retain respective unlocking authority when the second priority emergency state is not set, and wherein all of the plurality of door locks are set to the locking state and lose the unlocking authority when the second priority emergency state is set;

sending a second-level report to the police system when the second priority emergency state is set and all of the plurality of the door locks are set to the locking state; and selectively lifting or not lifting the second priority emergency state after logging in the backstage while the emergency control unit is physically disconnected from the control device, wherein all of the plurality of door locks restore the unlocking authority when the second priority emergency state is lifted, and wherein all of the plurality of door locks lose the unlocking authority when the second priority emergency state is not lifted.

In an example, the method further includes:

selectively setting or not setting a third-level emergency state, wherein the third-level emergency state is set by using a remote controller to remotely set at least one of the plurality of door locks in an area into the locking state, and the at least one of the plurality of door locks loses the unlocking authority when the third-level emergency state is set, wherein all of the plurality of door locks retain the unlocking authority when the third-level emergency state is not set;

reporting to the police system after the third-level emergency state is set; and selectively lifting or not lifting the third-level emergency state after using the computer or the smart mobile device to log in the backstage while the emergency control unit is physically disconnected from the control device, wherein the at least one of the plurality of door locks set in the locking state remains in loss of the unlocking authority when the third-level emergency state is not lifted, and wherein the at least one of the plurality of door locks set in the locking state restores the unlocking authority when the third-level emergency state is lifted.

In an example, each of the plurality of door locks includes an indicating device. Each indicating device sends out an emergency alarm signal when one of the first emergency state, the second emergency state, the third emergency state, and the gunshot control state is entered.

In an example, the method further includes:

connecting the control device with a fire detection device, wherein each of the plurality of door locks retains the respective unlocking authority when the fire detection device detects no presence of a fire, and wherein the control device sets a portion of the plurality of door locks near the fire into the locking state when the fire detection device detects the presence of a fire, wherein the portion of the plurality of door locks lose the unlocking authority, wherein the control device enters a fire control state, and wherein the fire is reported to a fire system through a fire reporting device connected to the control device; and selectively lifting or not lifting the fire control state, wherein the portion of the plurality of door locks set in the locking state owing to the fire loses the unlocking authority when the fire control state is not lifted, and the portion of the plurality of door locks set in the state owing to the fire restores the unlocking authority when the fire control state is lifted after logging in the backstage while the emergency control unit is disconnected from the control device.

In an example, each of the plurality of door locks includes an indicating device, and each indicating device sends out an emergency alarm signal when the fire control state is entered.

In the method for controlling door access with improved safety according to the present invention, after the fire control state is entered, a portion of the door locks within the fire control area can be set to the locking state and loses the unlocking authority, such that the closed doors can temporarily stop the fire from spreading. Furthermore, after the fire control state is entered, the fire system can be informed at the first moment, reducing the time for the firemen to reach the fire site.

In a second aspect, a method for controlling door access with improved safety according to the present invention includes:

connecting the plurality of door locks with a control device, with the control device obtaining control authority of each of the plurality of door locks;

detecting whether an emergency control unit is physically and removably connected to the control device, wherein each of all of the plurality of door locks obtains unlocking authority and locking authority and is capable of being operated independently when the emergency control unit is not connected to the control device;

identifying the emergency control unit when the emergency control unit is physically and removably connected to the control device, wherein each of all of the plurality of door locks obtains the unlocking authority and the locking authority and is capable of being operated independently when the emergency control unit is identified as being incorrect;

simultaneously setting all of the plurality of door locks connected to the control device into a locking state when the emergency control unit is identified as being correct, and the control device enters a first priority emergency state, wherein an alarm is generated while all of the plurality of door locks are set to the locking state, wherein all of the plurality of door locks lose the unlocking authority and are incapable of being unlocked independently when emergency control unit is identified as being correct;

sending a first-class report to a police system after all of the plurality of door locks have lost the unlocking authority;

deciding whether to physically disconnect the emergency control unit from the control member, wherein all of the plurality of door locks remain in the locking state and lose the unlocking authority when the emergency control unit is not physically disconnected from the control device;

logging in a backstage with a computer or a smart mobile device with a preset account and a password to connect with the control device when the emergency control unit is physically disconnected from the control device;

selectively lifting or not lifting the first priority emergency state after logging in the backstage, wherein all of the plurality of door locks set in the locking state remain in losing the unlocking authority when the first priority emergency state is not lifted, and wherein all of the plurality of door locks set in the locking state restore the unlocking authority and the locking authority and are capable of being operated independently when the first priority emergency state is lifted while the emergency control unit is physically disconnected from the control device;

selectively setting or not setting a second priority emergency state after logging in the backstage while the emergency control unit is physically disconnected from the control device, wherein all of the plurality of door locks retain respective unlocking authority when the second priority emergency state is not set, and wherein all of the plurality of door locks are set to the locking state and lose the unlocking authority when the second priority emergency state is set;

sending a second-level report to the police system when the second priority emergency state is set and all of the plurality of the door locks are set to the locking state; and selectively lifting or not lifting the second priority emergency state after logging in the backstage while the emergency control unit is physically disconnected from the control device, wherein all of the plurality of door locks restore the unlocking authority when the second priority emergency state is lifted, and wherein all of the plurality of door locks lose the unlocking authority when the second priority emergency state is not lifted.

In an example, the method further includes:

connecting the control device with a fire detection device, wherein each of the plurality of door locks retains the respective unlocking authority when the fire detection device detects no presence of a fire, and wherein the control device sets a portion of the plurality of door locks nearby the fire into the locking state when the fire detection device detects the presence of a fire, wherein the portion of the plurality of door locks lose the unlocking authority, wherein the control device enters a fire control state, and wherein the fire is reported to a fire system through a fire-reporting device connected to the control device; and selectively lifting or not lifting the fire control state, wherein the portion of the plurality of door locks set in the locking state owing to the fire lose the unlocking authority when the fire control state is not lifted, and the portion of the plurality of door locks set in the state owing to the fire restores the unlocking authority when the fire control state is lifted after logging in the backstage while the unlocking device is connected to the control device.

The present invention will become clearer in light of the following detailed description of illustrative embodiments of this invention described in connection with the drawings.

DETAILED DESCRIPTION OF THE INVENTION

Figure 1:
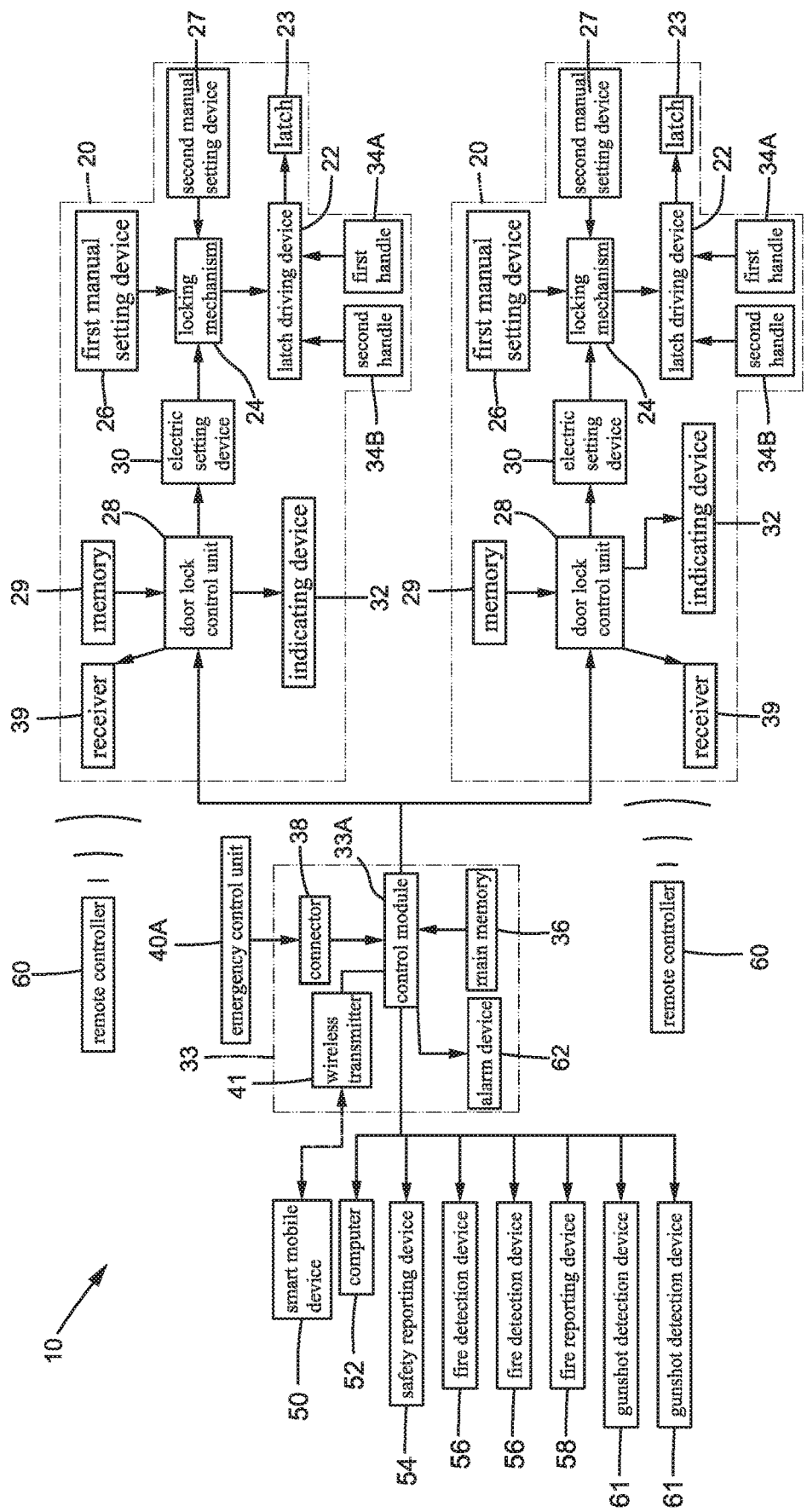
FIG. 1 is a diagrammatic block diagram of a central door access control system capable of carrying out a method for controlling door access with improved safety according to the present invention.
Figure 2:
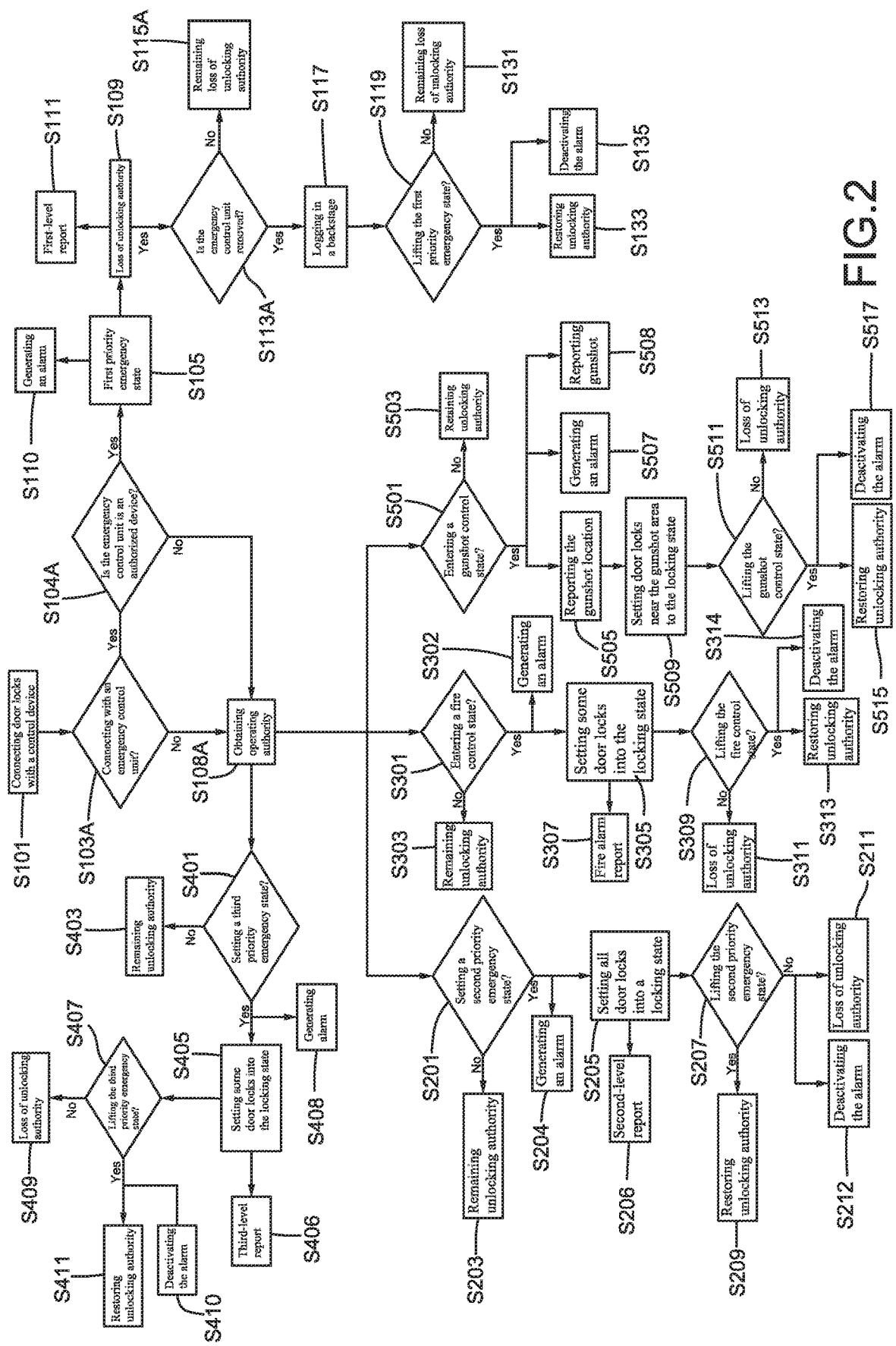
FIG. 2 is a diagrammatic flowchart illustrating operation of the method for controlling door access with improved safety according to the present invention.

FIG. 1 shows a diagrammatic block diagram of a central door access control system 10 capable of carrying out a method for controlling door access with improved safety according to the present invention. The central access control system 10 includes a plurality of door locks 20 mounted on a plurality of doors. Each of the plurality of doors is mounted in a passage to a space, such as a classroom.

Each of the plurality of door locks 20 includes a latch driving device 22 and a latch 23 actuatable by the latch driving device 22 to move between a latching position and an unlatching position. Each of the plurality of door locks 20 further includes a locking mechanism 24 for prohibiting operation of the latch driving device 22, a first manual setting device 26, a second manual setting device 27, an electric setting device 30, a door lock control unit 28 electrically connected to the electric setting device 30, and an indicating device 32. The first and second manual setting devices 26 and 27 are configured to set the locking mechanism 24 to a locking state or an unlocked state. Each indicating device 32 can include a lighting member capable of generating a green light and a red light and/or a speaker or a buzzer for generating sound. Each indicating device 32 is mounted to an inner side of a respective door. Each of the plurality of door locks 20 further includes a memory 29 electrically connected to the door lock control unit 28.

The first manual setting device 26 of each of the plurality of door locks 20 is mounted to the inner side of a respective door. The second manual setting device 27 of each of the plurality of door locks 20 is mounted to an outer side of a respective door. The first and second manual setting devices 26 and 27 can be key cylinders of any desired form as conventional including but not limited to of a commercially available type. A key can be used to release the locking state of the first manual setting device 26 or the second manual setting device 27. Thus, the locking mechanism 24 can be set to the locking state or the unlocked state. Each of the plurality of door locks 20 further includes a first handle 34A mounted to the outer side of the respective door (such as the outside) and operatively connected to the latch driving device 22. Each of the plurality of door docks 20 further includes a second handle 34B mounted to the inner side of the respective door (such as the inside) and operatively connected to the latch driving device 22.

The electric setting device 30 is also used to set the locking mechanism 24 to the locking state or the unlocked state. In a case that the locking mechanism 24 is set to the locking state by the electric setting device 30, it is impossible to set the locking mechanism 24 to the unlocked state by the first manual setting device 26 or the second manual setting device 27. Nevertheless, when the locking mechanism 24 is set to the unlocked state by the electric setting device 30, the locking mechanism 24 can be set to the locking state or the unlocked state by the first manual setting device 26 or the second manual setting device 27. Furthermore, when the locking mechanism 24 is set to the locking state by the first manual setting device 26 or the second manual setting device 27, the latch 23 cannot move to the unlatching position by operating the first handle 34A but can move to the unlatching position by operating the second handle 34B at the inner side of the respective door. On the other hand, when the locking mechanism 24 is set to the unlocked state by the electric setting device 30 and the first manual setting device 26 (or the second manual setting device 27), the latch 23 can move to the unlatching position by operating the first handle 34A or the second handle 34B, permitting subsequent opening of the respective door.

The central access control system 10 further includes a remote controller 60. Each of the plurality of door locks 20 further includes a receiver 39 electrically connected to the door lock control unit 28. The remote controller 60 and the receivers 39 can be operated to set at least one of the plurality of door locks 20 into the locking state within a predetermined range.

The central access control system 10 further includes a control device 33 having a control module 33A, a main memory 36 electrically connected to the control module 33A, a connector 38 electrically connected to the control module 33A, and a wireless transmitter 41 electrically connected to the control module 33A. The connector 38 can include an elongated slot that receives electrodes. The control module 33A is electrically connected to the door lock control units 28 of the plurality of door locks 20. The main memory 36 stores a comparison identification information corresponding to a controlling identification information of an emergency control unit 40A.

The central access control system 10 further includes a safety reporting device 54 electrically connected to the control module 33A of the control device 33, a plurality of fire detection devices 56 electrically connected to the control module 33A, a fire reporting device 58 electrically connected to the control module 33A, and a plurality of gunshot detection devices 61 electrically connected to the control module 33A. The control device 33 further includes an alarm device 62 electrically connected to the control module 33A. The control device 33 can activate the alarm device 62 to generate an alarm message, such as sound, light, or both.

The safety reporting device 54 is connected to the police system to inform the police system of emergency. The plurality of fire detection devices 56 is disposed in various places of a building to detect whether a fire occurs and to report the fire to the control module 33A. The fire reporting device 58 is connected to a fire system to inform the fire. The plurality of gunshot detection devices 61 is used to detect is there any ammunition in a specific range therearound. The plurality of gunshot detection devices 61 can, but should not be limited to, use a sound detection technique or an audio wave detection technique to determine whether a sound detected is a gunshot. An example of the gunshot detection system is disclosed in U.S. Pat. No. 9,830,932. The central access control system 10 further includes a computer 52 connected to the control device 33 and a smart mobile device 50 connected to the control device 33. The smart mobile device 50 can be connected to the control device 33 via the wireless transmitter 41 to a "backstage" (a software interface only accessible to a manager).

The control device 33 is configured to match with the emergency control unit 40A. The emergency control unit 40A can be a door access card and is configured to control the control device 33. A comparison identification information corresponding to the controlling identification information of the emergency control unit 40A is stored in the memory 29 of each of the plurality of door locks 20. An emergency state identification information is stored in the remote controller 60. When the remote controller 60 is used to set the plurality of door locks 20 to the locking state, the emergency state identification information sent by the remote controller 60 and received by a respective door lock 20 is compared with the comparison identification information in the respective memory 29. When the emergency state identification information is identified as being correct, the respective door lock 20 receiving the emergency state identification information from the remote controller 60 will be set to the locking state and will lose the unlocking authority.

In an example of carrying out the method for controlling door access with improved safety according to the present invention using the central access control system 10, for the sake of explanation, it will be assumed that each of the plurality of doors is closed and the latches 23 are in the latching position. Firstly, the method includes establishing a connection between the plurality of door locks 20 and the control device 33 (step S101), such that the control device 33 obtains the control authority of the plurality of door locks 20. Specifically, the control device 33 obtains the control authority of the electric setting device 30 of each of the plurality of door locks 20. Furthermore, the control device 33 can set at least one of the locking mechanisms 24 of the plurality of door locks 20 to the locking state or the unlocked state at the same time.

Next, it is identified whether an emergency control unit 40A is physically and removably connected to the control device 33 (step S103A). As an example of the physical and removable connection, the emergency control unit 40A in the form of a card is inserted into the control device 33 to be electrically connected to the connector 38, such that the control device 33 can read the controlling identification information in the emergency control unit 40A.

When the emergency control unit 40A is not connected to the control device 33, the plurality of door locks 20 obtains independent unlocking authority (step S108A). Namely, each and every of the plurality of door locks 20 can operate independently. Specifically, in the case that the emergency control unit 40A is not connected to the control device 33, the control device 33 actuates none of the electric setting devise 30 of the plurality of door locks 20, such that the locking mechanisms 24 of the plurality of door locks 20 remain in their original states. Furthermore, each of the plurality of door locks 20 permits use of the first manual setting device 26 or the second manual setting device 27 to set the respective locking mechanism 24 to the locking state or unlocked state. Furthermore, each of the plurality of door locks 20 set in the unlocked state allows operation of the respective first handle 34A or the respective second handle 34B to actuate the respective latch driving device 22 to thereby retract the respective latch 23 to the unlatching position.

On the other hand, when the emergency control unit 40A is physically and removably connected to the control device 33, the control device 33 identifies whether the emergency control unit 40A is an authorized device (step S104A). Specifically, the control device 33 compares the controlling identification information in the emergency control unit 40A with the comparison identification information in the main memory 36. When the control device 33 identifies that the enabling identification information in the unlocking device 40 does not match with the comparison identification information in the main memory 36 (the emergency control unit 40A is identified as being incorrect), the plurality of door locks 20 obtains independent unlocking authority (step S108A).

When the emergency control unit 40A physically and removably connected to the control device 33 is identified as being correct, all door locks 20 connected to the control device 33 are set to the locking state and are locked, which is a first priority emergency state S105. Specially, after the controlling identification information in the emergency control unit 40A is identified as being correct, the control device 33 will enter the first priority emergency state S105, and the electric setting devices 30 of all door locks 20 are actuated by the control device 33 to set the locking mechanisms 24 of all door locks 20 to the locking state, such that the unlocking authority of all door locks 20 is revoked (S109). In this case, each door cannot be operated to set the respective locking mechanism 24 to the unlocked state by inserting a key to operate the first manual setting device 26 or the second manual setting device 27. Thus, the door cannot be opened by the first handle 34A. Namely, without physical connection between the emergency control unit 40A and the connector 38 of the control device 33, all door locks 20 lose the unlocking authority (S109) and cannot be independently operated to the unlocked state. This achieves a control function of avoiding easy opening of all doors from the outside while still permitting the latch 23 to move to the unlatching position by operating the second handle 34B at the inner side of the respective door even though all door locks 20 lose the unlocking authority (S109). Furthermore, after the control device 33 enters the first priority emergency state S105, the indicating devices 32 of all door locks 20 send out an emergent alarm signal.

At the same time of entering the first priority emergency state S105, the control module 33A of the control device 33 activates the alarm device 62 to generate an alarm message in the form of at least one of sound and light.

After all door locks 20 have lost their unlocking authority, a first-level report is sent out to a police system (step S111). Specifically, after the emergency control unit 40A has been physically connected to the connector 38 of the control device 33 and all door locks 20 have lost the unlocking authority, the control device 33 actuates the safety reporting device 54 to inform the police system of the emergency event (such as an intrusion of an intruder into the school).

Next, in step S113A it is detected whether the emergency control unit 40A is physically disconnected from the control device 33. When the emergency control unit 40A is still in physical, electrical connection with the control device 33, all door locks 20 are set to lose the unlocking authority (step S115A). Specifically, in the case that the emergency control unit 40A is still in physical, electrical connection with the connector 38 of the control device 33 while all door locks 20 are in an emergency state losing the unlocking authority, all door locks 20 remain in the locking state and lose the unlocking authority.

When it is detected that the emergency control unit 40A is physically disconnected from the control device 33 in step S113A, the computer 52 or the smart mobile device 50 can be utilized to log in the backstage (using a preset account and a password) for connection with the control device 33 (S117). After logging in the backstage, the manager can select whether to lift the first priority emergency state (S119). Namely, after logging in the backstage, when the first priority emergency state S105 is not lifted, all door locks 20 set in the locking state remain in the unlocking authority-revoked state (S131). On the other hand, after logging in the backstage and the emergency control unit 40A is disconnected from the control device 33, when the first priority emergency state S105 is lifted, all door locks 20 set in the locking state restores the authority of independent locking and independent unlocking (S133). Furthermore, after the authority of independent locking and independent unlocking has been restored (S133), the control module 33A deactivates the alarm device 62 and stops operation of the indicating devices 32 of all door locks 20.

It is noted that after the first priority emergency state S105 is entered, even though the emergency event has been solved and the emergency control unit 40A is disconnected from the connector 38 of the control device 33, none of the door locks 20 is granted the unlocking authority. Specifically, all door locks 20 obtain the unlocking authority only after the emergency control unit 40A is identified as being correct and the first priority emergency state S105 is lifted after the manager logs in the backstage and lifts the first priority emergency state S105. After the unlocking authority is granted, the locking mechanism 24 of each of the plurality of door locks 20 can be set to the locking state or unlocked state through the first manual setting device 26 or the second manual setting device 27. This effectively avoids the intruder from lifting the first priority emergency state S105 by physically disconnecting the emergency control unit 40A from the connector 38 of the control device 33.

It is further noted that restoring the unlocking authority can be so set that all door locks 20 restore their states before entering the first priority emergency state S105. For example, in a case that a portion of all door locks 20 are independently set into the locking state and that the remaining portion of all door locks 20 are independently set into the unlocked state, after the first priority emergency state is lifted, the portion of all door locks 20 set into the locking state remains in the locking state but can be independently operated for unlocking purposes. Furthermore, after the first priority emergency state is lifted, the remaining portion of all door locks 20 set into the unlocked state restores the unlocked state and can be independently operated for locking purposes.

After the emergency control unit 40A has been physically disconnected from the control device 33 and after logging in the backstage, a second priority emergency state can be set (step S201). When the second priority emergency state is not set, all door locks 20 remain the unlocking authority (S203). When the second priority emergency state is set, all door locks 20 are set into the locking state S205 and lose the unlocking authority. Specifically, after the emergency control unit 40A is disconnected from the connector 38 of the control device 33 and the manager has logged-in the backstage by the computer 52 or the smart mobile device 50, the manager can use an interface of the backstage to select whether to set the second priority emergency state. For example, in a case that an intruder intrudes the school while the manager is away from the control device 33 and, thus, cannot physically connect the emergency control unit 40A to the control device 33 in time, the manager can use the smart mobile device 50 to log in the backstage, and an icon representing the second priority emergency state can be pressed, such that the control device 33 sets the locking mechanisms 24 of all door locks 20 to the locked state while the emergency control unit 40A is physically disconnected from the control device 33. Thus, all door locks 20 lose the unlocking authority. In this state, the latches 23 of all door locks 20 cannot move to the unlatching position by operating the first handles 34A but can move to the unlatching position by operating the second handles 34B. Furthermore, all door locks 20 cannot be independently set to the unlocking state. After the second priority emergency state is entered, the indicating device 32 of each of the plurality of door locks 20 sends out an emergency alarm signal.

While the second priority emergency state is entered, the control device 33 sends out a second-level report S206. After the second priority emergency state is set and all door locks 20 are set to the locking state, the status is reported to the police system. Specifically, the control device 33 activates the safety reporting device 54 to inform the police system of the emergency event (such as an intrusion by an intruder into the school).

At the same time of entering the second priority emergency state, the control module 33A of the control device 33 activates the alarm device 62 to generate an alarm message in the form of at least one of sound and light, such that a person (e.g., a person in the principal's office or a security office) near the control device 33 can be aware of the emergency state.

After logging in the backstage while the emergency control unit 40A is physically disconnected from the control device 33, the second priority emergency state can be optionally lifted (step S207). When the second priority emergency state is lifted, all door locks 20 restore the unlocking authority (S209) and the alarm device 62 stops. On the other hand, when the second priority emergency state is not lifted, all door locks 20 remain in the unlocking authority-revoked state. Specifically, after the emergency event has been solved (e.g., the intruder has been arrested) and the emergency control unit 40A is disconnected from the connector 38 of the control device 33, an icon (on the interface of the backstage) representing lifting the second priority emergency state can be pressed. Thus, all door lock 20 restore the unlocking authority (S209) and the alarm device 62 stops. In a case that the icon representing lifting the second priority emergency state is not pressed, all door locks 20 remain in the unlocking authority-revoked state (S211) and the alarm device 62 continues to operate.

It is noted that when the second priority emergency state is entered and the emergency control unit 40A is physically connected to the connector 38 of the control device 33, the control device 33 enters the first priority emergency state S105. Thus, even though the computer 52 or the smart mobile device 50 is utilized to log in the backstage and an icon is pressed to lift the first priority emergency state or the second priority emergency state, none of the door locks 20 restore the unlocking authority. Thus, even though the intruder robs the manager of the computer 52 or the smart mobile device 50, the intruder cannot utilize the computer 52 or the smart mobile device 50 to restore the unlocking authority.

It is further noted that restoring the unlocking authority can be so set that all door locks 20 restore their states before entering the second priority emergency state. For example, before entering the second priority emergency state, in a case that a portion of all door locks 20 are independently set into the locking state and that the remaining portion of all door locks 20 are independently set into the unlocked state, after the second priority emergency state is lifted, the portion of all door locks 20 set into the locking state remains in the locking state but can be independently operated for unlocking purposes. Furthermore, after the second priority emergency state is lifted, the remaining portion of all door locks 20 set into the unlocked state restores the unlocked state and can be independently operated for locking purposes.

The method for controlling door access with improved safety according to the present invention further includes whether to enter a fire control state S301. When none of the fire detection devices 56 connected to the control device 33 detects a fire, each of the plurality of door locks retains its unlocking authority S303. When one of the plurality of fire detection devices 56 detects a fire, the control device 33 controls a portion of the plurality of door locks 20 associated with the position of the one of the plurality of fire detection devices 56 detecting the fire and revokes the unlocking authority of the portion of the plurality of door locks 20. Furthermore, at the same time of entering the fire control state S301, the control module 33A operates to generate an alarm message by activating the alarm device 62 to generate at least one of sound and light (step S302), such that the person near the control device 33 can be aware of the emergency state (the fire event). Specifically, the plurality of fire detection devices 56 can be disposed in proper locations in a building. When one of the plurality of fire detection devices 56 detects a fire, the control device 33 automatically sets a portion of the plurality of door locks 20 associated with the location of the one of the plurality of fire detection devices 56 to the locking state (S305). Thus, the associated doors cannot be opened, reducing the spreading speed of the fire. Furthermore, the control device 33 sends out a fire alarm report (S307). Namely, after a fire control state is entered, the control device 33 uses the fire reporting device 58 to report the fire to the fire system, and the firemen can reach the fire site at the first moment to extinguish the fire.

Next, the fire control state can be lifted (S309). In a case that the fire control state is not lifted, the portion of the plurality of door locks 20 set to the locking state owing to the fire loses the unlocking authority (S311), and the alarm device 62 keeps operating to generate the alarm. After logging in the backstage while the emergency control unit 40A is physically disconnected from the control device 33, the fire control state can be optionally lifted to restore the unlocking authority (S313), and the alarm is deactivated to stop the alarm device 62 (S314). Specifically, after the fire has been put out, the manager can log in the backstage while the emergency control unit 40A is physically disconnected from the connector 38 of the control device 33 and is identified as being correct. Then, the manager can press an icon representing lifting of the fire control state, such that the portion of the plurality of door locks 20 (set to the locking state owing to the fire) restores the unlocking authority, and the control module 33A deactivates the alarm to stop the alarm device 62 (S212). On the other hand, when manager does not press the icon representing lifting of the fire control state, the portion of the plurality of door locks 20 (set to the locking state owing to the fire) remains in the unlocking authority-revoked state (S211), and the alarm device 62 keeps operating to generate the alarm.

It is further noted that restoring the unlocking authority can be so set that all door locks 20 restore their states before entering the fire control state. For example, before entering the fire control state, in a case that a portion of all door locks 20 are independently set into the locking state and that the remaining portion of all door locks 20 are independently set into the unlocked state, after the fire control state is lifted, the portion of all door locks 20 set into the locking state remains in the locking state but can be independently operated for unlocking purposes. Furthermore, after the fire control state is lifted, the remaining portion of all door locks 20 set into the unlocked state restores the unlocked state and can be independently operated for locking purposes.

Next, a third priority emergency state can be set (step S401). The remote controller 60 can be used to remotely set at least one of the plurality of door locks 20 to the locking state. In a case that the third priority emergency state is not set, all door locks 20 retains the unlocking authority (step S403). In a case that a portion of the plurality of door locks 20 is set to the locking state (step S405), when the third priority emergency state is set, the portion of the plurality of door locks 20 set to the locking state loses the unlocking authority. Furthermore, an alarm is generated when the third priority emergency state is entered (step S408). The control module 33A activates the alarm device 62 to generate an alarm message notifying a person near the control device 33 of entrance of the third priority emergency state. Specifically, the remote controller 60 matches with the receiver 39 of each of the plurality of door locks 20. When the emergency control unit 40A is physically disconnected from the connector 38 of the control device 33, one or more of the plurality of door locks 20 within a certain range are set to the locking state and lose the unlocking authority (cannot be set to the unlocked state by the first manual setting device 26 or the second manual setting device 27). Furthermore, all door locks 20 send out an emergent alarm signal through the indicating devices 32 and send a signal back to the control device 33, such that the control module 33A activates the alarm device 62 to generate an alarm message (step S408), notifying a person near the alarm device 62 of entrance of the third emergency state through the alarm message. Thus, the manager in a location away from the control device 33 can set the desired door locks 20 to the locking state under emergency. As a result, the manager can set at least one of the plurality of door locks 20 within a smaller area more quickly than setting the second priority emergency state through log-in of the backstage. Furthermore, a third-level report (step S406) can be reported to the police system after setting the third priority emergency state.

Next, the third priority emergency state can be lifted (step S407). Specifically, the computer 52 or the smart mobile device 50 is utilized to log in the backstage while the emergency control unit 40A is physically disconnected from the connector 38 of the control device 30, and lifting of the third priority emergency state can be executed. When lifting of the third priority emergency state is not executed, a portion of the plurality of door locks 20 set to the locking state remains in the unlocking authority-revoked state (step S409) and the alarm device 62 keeps operating. When the lifting of the third priority emergency state is executed, the portion of the plurality of door locks 20 set to the locking state restores the unlocking authority (step S411), and the alarm device 62 is deactivated to stop the alarm (step S410).

The next step S501 is to detect whether to enter a gunshot control state. When a gunshot event is detected by any one of the plurality of gunshot detection devices 61, the gunshot location is reported to the control device 33 (S505). Specifically, each of the plurality of gunshot detection devices 61 has an independent hardware identification number, and a gunshot location database is created according to the hardware identification numbers. When any one of the plurality of gunshot detection devices 61 detects a gunshot event, the gunshot detection device 61 detecting the gunshot event sends a reporting signal including its own hardware identification number, such that the control module 33A receiving the reporting signal can know the approximate location where the gunshot event occurs. An alarm is generated while entering the gunshot control state (see S507). In step S507, the control module 33A activates the alarm device 62 to generate at least one of sound and light, such that the person near the control device 33 (such as the principal in the principal's office or a guard in the security office) can be aware of the gunshot event through the alarm device 62. Furthermore, the indicating device 32 of each of the plurality of door locks 20 is activated by the control device 33 to generate an emergency alarm signal, notifying persons at places other than the gunshot location. Furthermore, the person can log in the backstage to check the approximate location of the gunshot event (the exact gunshot location could be spaced from the gunshot detection device 61 that detects the gunshot), permitting the person (such as the principal in the principal's office or a guard in the security office) can quickly respond to the gunshot at the first moment. On the other hand, when no gunshot event is detected by the plurality of gunshot detection devices 61, the gunshot control state is not entered.

Furthermore, in step S501 the gunshot event is reported at the same time of entrance of the gunshot control state S501. Specifically, the gunshot emergency is reported to the police system through the safety reporting device 54, such that the police can reach the gunshot location in the shortest time.

At least one of the plurality of door locks 20 near the gunshot location is set to the locking state (step S509). Specifically, the control module 33A of the control device 33 sets the at least one of the plurality of door locks 20 near the gunshot location to the locking state according to the hardware identification number contained in the reporting signal sent by the gunshot detection device 61 that detects the gunshot. Thus, the at least one of the plurality of door locks 20 loses its unlocking authority to prevent or delay the gunman from passing through the respective door or doors, reducing the casualty.

It is then determined whether the gunman is arrested to decide whether to lift the gunshot control state (step S511). When the gunman is not arrested, the at least one of the plurality of door locks 20 still loses its unlocking authority (step S513). On the other hand, when the gunman is arrested, the at least one of the plurality of door locks 20 set to the locking state restores its unlocking authority (step S515) to permit independent operation. At the same time, the alarm device 62 is deactivated to stop the alarm (step S517).

In the method for controlling door access with improved safety according to the present invention, the first priority emergency state is entered when the emergency control unit 40A is physically connected to the connector 38 of the control device 33, such that all door locks 20 are set to the locking state and lose the unlocking authority. This can be applied in places like schools or government authorities to enable a rapid response when an emergency event occurs. For example, when an intruder intrudes a school, all door locks 20 are set to the locking state by entering the first priority emergency state, effectively hindering the intruder.

In the method for controlling door access with improved safety according to the present invention, when the emergency control unit 40A is physically disconnected from the connector 38 of the control device 33, the computer 52 or the smart mobile device 50 can be used to log in the backstage for setting the second priority emergency state, simultaneously setting all door locks 20 to the locking state and revoking the unlocking authority of all door locks 20. Thus, even though the manager is not near the control device 33 and cannot connect the emergency control unit 40A to the connector 38 of the control device 33 in time, the manager can still remotely control all door locks 20 to the locking state.

In the method for controlling door access with improved safety according to the present invention, the remote controller 60 can be used to set one or more of the plurality of door locks 20 within a certain area to the locking state and to revoke the unlocking authority of the one or more of the plurality of door locks 20. Furthermore, the manager or a sub-manager having a lower managing authority can rapidly set the door locks 20 according to the actual situation.

In the method for controlling door access with improved safety according to the present invention, when the first, second, or third priority emergency state or the gunshot control state is entered, the control device 33 can use the safety reporting device 54 to report the emergency event (such as an intrusion by an intruder) to the police system, improving the reporting efficiency.

The method for controlling door access with improved safety according to the present invention provides detection and control of a gunshot to rapidly detect the gunshot location, and the control device 33 can be used to rapidly set the door locks 20 near the gunshot location to the locking state and to revoke the unlocking authority, delaying or stopping the gunman from moving to another location.

In the method for controlling door access with improved safety according to the present invention, after the fire control state is entered, a portion of the door locks 20 within the fire control area can be set to the locking state and loses the unlocking authority, such that the closed doors can temporarily stop the fire from spreading. Furthermore, after the fire control state is entered, the fire system can be informed at the first moment, reducing the time for the firemen to reach the fire site.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A method for controlling door access, comprising:
connecting a plurality of door locks with a control device, with the control device obtaining control authority of each of the plurality of door locks;
detecting whether an emergency control unit is physically and removably connected to the control device, wherein each of all of the plurality of door locks obtains unlocking authority and locking authority and is capable of being operated independently when the emergency control unit is not connected to the control device;
identifying the emergency control unit when the emergency control unit is physically and removably connected to the control device, wherein each of all of the plurality of door locks obtains the unlocking authority and the locking authority and is capable of being operated independently when the emergency control unit connected to the control device is identified as being incorrect;
simultaneously setting all of the plurality of door locks connected to the control device into a locking state when the emergency control unit connected to the control device is identified as being correct, and the control device enters a first priority emergency state, wherein an alarm is generated while all of the plurality of door locks are set to the locking state, wherein all of the plurality of door locks lose the unlocking authority and are incapable of being unlocked independently when the emergency control unit is identified as being correct;
deciding whether to physically disconnect the emergency control unit from the control member, wherein all of the plurality of door locks remain in the locking state and lose the unlocking authority when the emergency control unit is not physically disconnected from the control device;
logging in a backstage with a computer or a smart mobile device with a preset account and a password to connect with the control device when the emergency control unit is physically disconnected from the control device;
selectively lifting or not lifting the first priority emergency state after logging in the backstage, wherein all of the plurality of door locks set in the locking state remain in losing the unlocking authority when the first priority emergency state is not lifted, and wherein all of the plurality of door locks set in the locking state restore the unlocking authority and the locking authority and are capable of being operated independently when the first priority emergency state is lifted while the emergency control unit is physically disconnected from the control device;
detecting whether a gunshot event occurs, wherein each of the plurality of door locks retains the unlocking authority when no gunshot event is detected, wherein a gunshot information containing a gunshot location of the gunshot event is sent to the control device when the gunshot event is detected, and wherein the control device reports the gunshot location to a police system;
setting at least one of the plurality of door locks near the gunshot location to the locking state and revoking the unlocking authority of the at least one of the plurality of door locks, and entering a gunshot control state; and
selectively lifting or not lifting the gunshot control state after logging in the backstage while the emergency control unit is physically disconnected from the control device, wherein the at least one of the plurality of door locks near the gunshot location loses the unlocking authority when the gunshot control state is not lifted, and wherein when the gunshot control state is lifted, the at least one of the plurality of door locks near the gunshot location restores the unlocking authority and the locking authority and is capable of being operated independently.

2. The method for controlling door access as claimed in claim 1, further comprising:
sending a first-class report to the police system after all of the plurality of door locks have lost the unlocking authority;
generating an alarm when the control device receives the gunshot location information of the gunshot event; and
deactivating the alarm when the gunshot control state is lifted.

3. The method for controlling door access as claimed in claim 1, further comprising:
selectively setting or not setting a second priority emergency state after logging in the backstage while the emergency control unit is physically disconnected from the control device, wherein all of the plurality of door locks retain respective unlocking authority when the second priority emergency state is not set, and wherein all of the plurality of door locks are set to the locking state and lose the unlocking authority when the second priority emergency state is set;
sending a second-level report to the police system when the second priority emergency state is set and all of the plurality of the door locks are set to the locking state; and
selectively lifting or not lifting the second priority emergency state after logging in the backstage while the emergency control unit is physically disconnected from the control device, wherein all of the plurality of door locks restore the unlocking authority when the second priority emergency state is lifted, and wherein all of the plurality of door locks lose the unlocking authority when the second priority emergency state is not lifted.

4. The method for controlling door access as claimed in claim 3, further comprising:
selectively setting or not setting a third-level emergency state, wherein the third-level emergency state is set by using a remote controller to remotely set at least one of the plurality of door locks in an area into the locking state, and the at least one of the plurality of door locks loses the unlocking authority when the third-level emergency state is set, wherein all of the plurality of door locks retain the unlocking authority when the third-level emergency state is not set;
reporting to the police system after the third-level emergency state is set; and
selectively lifting or not lifting the third-level emergency state after using the computer or the smart mobile device to log in the backstage while the emergency control unit is physically disconnected from the control device, wherein the at least one of the plurality of door locks set in the locking state remains in loss of the unlocking authority when the third-level emergency state is not lifted, and wherein the at least one of the plurality of door locks set in the locking state restores the unlocking authority when the third-level emergency state is lifted.

5. The method for controlling door access as claimed in claim 4, wherein each of the plurality of door locks includes an indicating device, wherein each indicating device sends out an emergency alarm signal when one of the first emergency state, the second emergency state, the third emergency state, and the gunshot control state is entered.

6. The method for controlling door access as claimed in claim 1, further comprising:
connecting the control device with a fire detection device, wherein each of the plurality of door locks retains the respective unlocking authority when the fire detection device detects no presence of a fire, and wherein the control device sets a portion of the plurality of door locks near the fire into the locking state when the fire detection device detects the presence of a fire, wherein the portion of the plurality of door locks lose the unlocking authority, wherein the control device enters a fire control state, and wherein the fire is reported to a fire system through a fire reporting device connected to the control device; and
selectively lifting or not lifting the fire control state, wherein the portion of the plurality of door locks set in the locking state owing to the fire loses the unlocking authority when the fire control state is not lifted, and the portion of the plurality of door locks set in the state owing to the fire restores the unlocking authority when the fire control state is lifted after logging in the backstage while the emergency control unit is disconnected from the control device.

7. The method for controlling door access as claimed in claim 6, wherein each of the plurality of door locks includes an indicating device, wherein each indicating device sends out an emergency alarm signal when the fire control state is entered.

8. A method for controlling door access, comprising:
connecting the plurality of door locks with a control device, with the control device obtaining control authority of each of the plurality of door locks;
detecting whether an emergency control unit is physically and removably connected to the control device, wherein each of all of the plurality of door locks obtains unlocking authority and locking authority and is capable of being operated independently when the emergency control unit is not connected to the control device;
identifying the emergency control unit when the emergency control unit is physically and removably connected to the control device, wherein each of all of the plurality of door locks obtains the unlocking authority and the locking authority and is capable of being operated independently when the emergency control unit is identified as being incorrect;
simultaneously setting all of the plurality of door locks connected to the control device into a locking state when the emergency control unit is identified as being correct, and the control device enters a first priority emergency state, wherein an alarm is generated while all of the plurality of door locks are set to the locking state, wherein all of the plurality of door locks lose the unlocking authority and are incapable of being unlocked independently when emergency control unit is identified as being correct;
sending a first-class report to a police system after all of the plurality of door locks have lost the unlocking authority;
deciding whether to physically disconnect the emergency control unit from the control member, wherein all of the plurality of door locks remain in the locking state and lose the unlocking authority when the emergency control unit is not physically disconnected from the control device;
logging in a backstage with a computer or a smart mobile device with a preset account and a password to connect with the control device when the emergency control unit is physically disconnected from the control device;
selectively lifting or not lifting the first priority emergency state after logging in the backstage, wherein all of the plurality of door locks set in the locking state remain in losing the unlocking authority when the first priority emergency state is not lifted, and wherein all of the plurality of door locks set in the locking state restore the unlocking authority and the locking authority and are capable of being operated independently when the first priority emergency state is lifted while the emergency control unit is physically disconnected from the control device;
selectively setting or not setting a second priority emergency state after logging in the backstage while the emergency control unit is physically disconnected from the control device, wherein all of the plurality of door locks retain respective unlocking authority when the second priority emergency state is not set, and wherein all of the plurality of door locks are set to the locking state and lose the unlocking authority when the second priority emergency state is set;
sending a second-level report to the police system when the second priority emergency state is set and all of the plurality of the door locks are set to the locking state;
selectively lifting or not lifting the second priority emergency state after logging in the backstage while the emergency control unit is physically disconnected from the control device, wherein all of the plurality of door locks restore the unlocking authority when the second priority emergency state is lifted, and wherein all of the plurality of door locks lose the unlocking authority when the second priority emergency state is not lifted.

9. The method for controlling door access as claimed in claim 8, further comprising:
connecting the control device with a fire detection device, wherein each of the plurality of door locks retains the respective unlocking authority when the fire detection device detects no presence of a fire, and wherein the control device sets a portion of the plurality of door locks nearby the fire into the locking state when the fire detection device detects the presence of a fire, wherein the portion of the plurality of door locks lose the unlocking authority, wherein the control device enters a fire control state, and wherein the fire is reported to a fire system through a fire-reporting device connected to the control device; and
selectively lifting or not lifting the fire control state, wherein the portion of the plurality of door locks set in the locking state owing to the fire lose the unlocking authority when the fire control state is not lifted, and the portion of the plurality of door locks set in the state owing to the fire restores the unlocking authority when the fire control state is lifted after logging in the backstage while the unlocking device is connected to the control device.

10. The method for controlling door access as claimed in claim 8, further comprising:
selectively setting or not setting a third-level emergency state, wherein the third-level emergency state is set by using a remote controller to remotely set at least one of the plurality of door locks in an area into a locking state, and the at least one of the plurality of door locks loses the unlocking authority, wherein all of the plurality of door locks retain the unlocking authority when the third-level emergency state is not set;

reporting to the police system after the third-level emergency state is set; and selectively lifting or not lifting the third-level emergency state after using the computer or the smart mobile device to log in the backstage while the unlocking device is physically disconnected from the control device, wherein the at least one of the plurality of door locks set in the locking state remains in loss of the unlocking authority when the third-level emergency state is not lifted, and wherein the at least one of the plurality of door locks set in the locking state restores the unlocking authority when the third-level emergency state is lifted.

11. The method for controlling door access as claimed in claim 10, wherein each of the plurality of door locks includes an indicating device, wherein each indicating device sends out an emergency alarm signal when one of the first emergency state, the second emergency state, and the third emergency state is entered.

12. The method for controlling door access as claimed in claim 9, wherein each of the plurality of door locks includes an indicating device, wherein each indicating device sends out an emergency alarm signal when the fire control state is entered.

* * * * *